US008812832B2

(12) United States Patent
Amini et al.

(10) Patent No.: US 8,812,832 B2
(45) Date of Patent: *Aug. 19, 2014

(54) METHOD AND SYSTEM OF USING A NON-NATIVE OPERATING SYSTEM FOR SCANNING AND MODIFYING SYSTEM CONFIGURATION DATA OF A NATIVE OPERATING SYSTEM

(75) Inventors: Pedram Amini, Austin, TX (US); Rohit Dhamankar, Austin, TX (US); David S. Endler, Austin, TX (US)

(73) Assignee: Avast Software A.S., Prague (CZ)

( * ) Notice: Subject to any disclaimer, the term of this patent is extended or adjusted under 35 U.S.C. 154(b) by 161 days.

This patent is subject to a terminal disclaimer.

(21) Appl. No.: 13/030,693

(22) Filed: Feb. 18, 2011

(65) Prior Publication Data

US 2012/0216028 A1 Aug. 23, 2012

(51) Int. Cl.
| | | |
|---|---|---|
| G06F 1/24 | (2006.01) | |
| G06F 9/00 | (2006.01) | |
| G06F 9/445 | (2006.01) | |
| G06F 21/56 | (2013.01) | |
| G06F 9/44 | (2006.01) | |

(52) U.S. Cl.
CPC .......... *G06F 9/44505* (2013.01); *G06F 9/4401* (2013.01); *G06F 21/564* (2013.01); *G06F 2221/2153* (2013.01)
USPC .......................................................... 713/100

(58) Field of Classification Search
CPC .. G06F 21/564; G06F 9/44505; G06F 9/4401
USPC .......................................................... 713/100
See application file for complete search history.

(56) References Cited

U.S. PATENT DOCUMENTS

| | | | | |
|---|---|---|---|---|
| 7,127,635 | B2 * | 10/2006 | Takamoto et al. | ............. 714/6.3 |
| 7,383,580 | B1 | 6/2008 | Frentz | |
| 8,069,343 | B2 | 11/2011 | Concorso | |
| 8,209,680 | B1 | 6/2012 | Le et al. | |
| 2004/0044889 | A1 * | 3/2004 | Kamataki | ......................... 713/2 |
| 2004/0225874 | A1 | 11/2004 | Burr et al. | |
| 2006/0294592 | A1 * | 12/2006 | Polyakov et al. | ............... 726/24 |
| 2007/0113062 | A1 | 5/2007 | Osburn et al. | |
| 2008/0052507 | A1 * | 2/2008 | Chow et al. | ....................... 713/2 |
| 2008/0301426 | A1 * | 12/2008 | Arges et al. | ....................... 713/2 |

(Continued)

OTHER PUBLICATIONS

Bart's PE Plugins and Information, [online] [retrieved on Feb. 22, 2013]. Retrieved from the Internet: <URL: www.hallsted.us/barts-pe-plugins-mlh/barts-pe-plugins-mlh.html>.*

(Continued)

*Primary Examiner* — Thomas Lee
*Assistant Examiner* — Robert Cassity
(74) *Attorney, Agent, or Firm* — Conley Rose, P.C.

(57) ABSTRACT

Modifying system configuration data. At least some of the illustrative embodiments are methods including changing operation of a program on a computer system that comprises a native operating system stored on a long term storage device. In some cases, the changing by: reading system configuration data of the native operating system, the reading by a scan program executed under a non-native operating system booted on the computer system; identifying, by the scan program, the program on the long term storage device; and modifying, by the scan program, the system configuration data of the native operating system such that the change in operating of the program is implemented on a subsequent boot of the computer system under the native operating system.

24 Claims, 4 Drawing Sheets

(56) References Cited

U.S. PATENT DOCUMENTS

2009/0013409 A1* 1/2009 Wenzinger et al. ............. 726/24
2009/0217258 A1* 8/2009 Wenzinger et al. ........... 717/173
2010/0023602 A1* 1/2010 Martone ....................... 709/220
2011/0214185 A1   9/2011 Parish et al.

OTHER PUBLICATIONS

Bart's PE Plugins and Information, [online] [retrieved on Feb. 22, 2013]. Retrieved from the Internet: <URL: www.hallsted.uslbarts-pe-plugins-mlhlbarts-pe-plugins-mlh.html>.*
Peter Norris BSc (Hons), MBCS "The Internal Structure of the Windows Registry", Defence College of Management and Technology—Department of Informatics and Sensors—Cranfield University—Feb. 2009.
Timothy D. Morgan; The Windows NT* Registry File Format Version 0.4—tim-registry@sentinelchicken.org—Jun. 9, 2009.
Wikipedia Article, titled "Rootkit"; http://www.wikipedia.org, accessed Feb. 17, 2011.
Wikipedia Article, titled "Trojan horse (computing)"; http://www.wikipedia.org, accessed Feb. 17, 2011.
Wikipedia Article, titled "Computer virus"; http://www.wikipedia.org, accessed Feb. 17, 2011.
Wikipedia Article, titled "GNU GRUB"; http://www.wikipedia.org, accessed Feb. 17, 2011.
Wikipedia Article, titled "Master boot record"; http://www.wikipedia.org, accessed Feb. 17, 2011.
Wikipedia Article, titled "Booting"; http://www.wikipedia.org, accessed Feb. 17, 2011.
Wikipedia Article, titled "Cryptographic hash function"; http://www.wikipedia.org, accessed Feb. 17, 2011.
Office Action issued Dec. 19, 2012 in U.S. Appl. No. 13/030,669.
Office Action issued Dec. 7, 2012 in U.S. Appl. No. 13/030,715.

* cited by examiner

METHOD AND SYSTEM OF USING A NON-NATIVE OPERATING SYSTEM FOR SCANNING AND MODIFYING SYSTEM CONFIGURATION DATA OF A NATIVE OPERATING SYSTEM

CROSS-REFERENCE TO RELATED APPLICATIONS

This application shares a specification, and is related to, the following concurrently filed applications, all of which are incorporated by reference herein as if reproduced in full below: U.S. application Ser. No. 13/030,669 Titled "Method and system for disabling malware programs"; and U.S. application Ser. No. 13/030,715 Titled "Method and system of posting achievements regarding scans for malware programs".

BACKGROUND

Computer systems operate based on software, such as operating systems and user programs. However, computer systems are subject to being "infected" by unwanted programs such as viruses, worms, spyware, adware, and crimeware. Such unwanted programs may have minor effects, such as degrading computer system performance, or major effects such as gathering private information regarding the user. Computer systems are also subject to performance degradation due to one or many legitimate programs being installed or user initiated configuration changes for instance. The cumulative effect of one or more intentionally installed programs or user changes may also slow computer boot time and degrade overall performance.

Many companies produce "anti-virus" software designed to detect and remove unwanted programs, the removal either from the computer system directly, or from peripheral devices such as removable hard drives. However, unwanted programs are in many cases sophisticated pieces of code, capable of concealing themselves, and also thwarting efforts to detect and remove them. The battle between anti-virus software manufacturers and those who write such programs is continually evolving. Many companies also produce "tune-up" software designed to optimize the performance, boot time, and overall user experience on a computer system. Making some performance enhancing changes to a running computer system can be challenging and risky, and many times requires one or more reboots which may not be available to all users. Also, certain application and operating system modifications may require the user to inconveniently close one or many running applications Thus, any technique which assists anti-virus and tune-up software makers in detecting and removing unwanted programs, and tune-up software makers in performing safe changes, would provide a competitive advantage in the market place.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the terms "couple" and "coupled" and "couples" are intended to mean either an indirect or direct connection. Thus, if a first device couples to a second device, that connection may be through a direct connection or through an indirect connection via other devices and connections.

"Native operating system" shall mean an operating system stored on a long term storage device coupled to a computer system, and on which the computer system boots in the absence of instructions to the contrary received from a user of the computer system.

"Non-native operating system" shall mean an operating system that is distinct from the native operating system.

"Malware program" shall mean any malicious program such as, but not limited to, computer viruses, worms, Trojan horses, spyware, adware, crimeware, and rootkits. The terms "malware program" shall also mean a legitimate program installed in a way that executable code of the legitimate program is scheduled to utilize or utilizes processor cycles during periods of time when the legitimate program is not being directly or indirectly used.

"System configuration data" shall mean configuration settings for an operating system and applications that run under the operating system. The fact that system configuration data may be spread across multiple files on a long term storage device shall not obviate the status as system configuration data. Non-limiting examples of system configuration data include data within the registry of Microsoft® Windows®-based operating systems, ".INI" files for Microsoft® Windows®-based operating systems, system wide configuration files for Linux®-based operating systems, and property list files in the Mac OS X operating system.

"Social network" shall mean a service that allows a group of individuals to communicate with each other. Each individual associates with the "social network" as a member with a member profile, and at least a portion of the member profile is viewable by other members. The members of the "social network" communicate information either with all of the members or a select sub-set of the members.

"Managed by" with reference to a social network shall refer to a legal entity responsible for control and operation. The fact that the social network may be hosted on computers not owned by the legal entity, and that third parties may post items to the social network, shall not obviate the fact a social network is managed by the legal entity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Particular embodiments discussed herein are directed to the detection of malware programs on computer systems. More particularly, at least some embodiments discussed herein are directed to detection and removal of malware programs during periods of time when the native operating system of a computer system is not in operation, and thus the malware program is unable to exercise defensive capabilities to avoid detection and removal. In order to be user friendly, however, the inventors of the present specification have created automated mechanisms to enable a non-technical computer system user to boot a non-native operating system on their computer system, perform the scanning and removal of the malware programs as needed, increase performance under the native operating system and installed applications, and then configure the computer system to once again boot on the native operating system.

Figure 1:
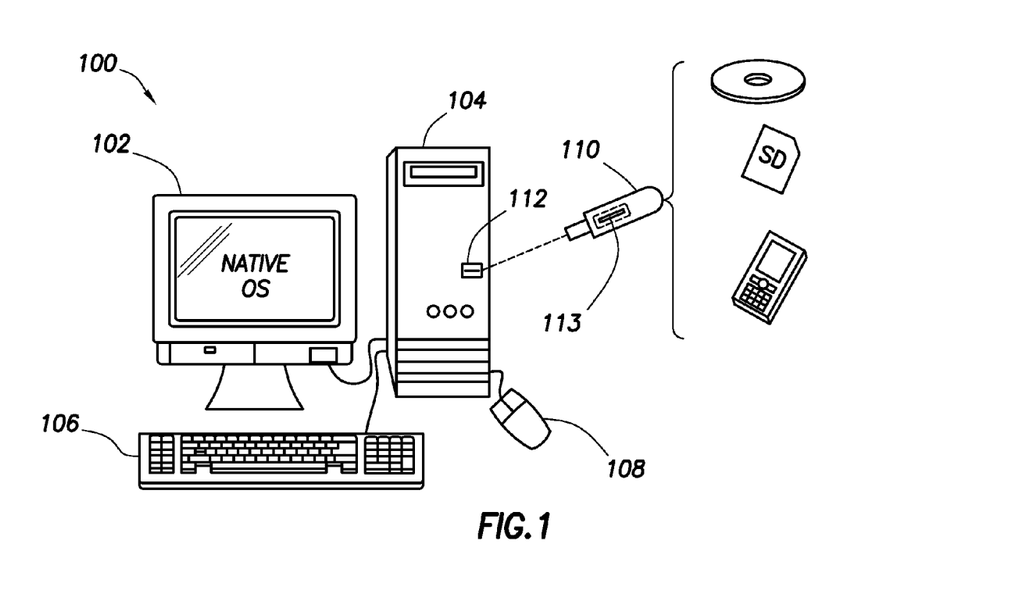
FIG. 1 shows a system in accordance with at least some embodiments.

FIG. 1 shows an illustrative system to highlight various embodiments. In particular, FIG. 1 shows a computer system 100. The computer system 100 is illustrated as a "desktop" computer, with separate display device 102, processing box 104, keyboard 106, and mouse 108. However, the various embodiments are equally applicable to any computer system, including portable computers, laptop computers, tablet devices, and computer systems that do not have dedicated display devices and keyboards (e.g., server computer systems). The illustrated computer system 100 is shown operating under a native operating system ("Native OS"). In some cases the native operating system is a Windows® brand operating system available from Microsoft Corporation, of Redmond, Wash. For example, the native operating system may be a Windows® NT operating system, a Windows® XP operating system, or a Windows® 7 operating system. Other operating systems may be equivalently used as the native operating system, including Unix-based operating systems (such as System V, BSD, and GNU/Linux). The various embodiments were developed in the context of the native operating system being Windows®, and thus the remaining description is based on developmental context. However, the developmental context shall not be read as a limitation as to the applicability of the various embodiments.

Detecting and disabling (e.g., by modifying and/or removing) a malware program in accordance with the various embodiments may begin by coupling a portable media to the computer system during periods of time when the computer system 100 is running under or controlled by the native operating system. FIG. 1 shows a portable media 110 illustratively coupling to the computer system by way of an interface or communication port 112. The portable media 110 may take a variety of forms. For example, the portable media 110 may be a flash memory device that directly couples to the port 112, or the portable media 110 may be a flash memory device used in conjunction with a Universal Serial Bus (USB) interface. In the illustrative case of the flash memory in combination with the USB interface, the portable media 110 may be a "USB memory stick" that couples to the computer system 100 by way of a USB interface. In other cases, the portable media 110 may be a secure digital (SD) card, often used as the memory for video capture devices such as still and motion video cameras. In the illustrative case of the portable media 110 being an SD card, the port 112 may be a SD card reader. In yet still other cases, the portable memory device 110 may be an optical disk (e.g. a compact disk (CD), or a digital versatile disk (DVD)). In the illustrative case of the portable media 110 being an optical disk, the coupling of the optical disk may be by way of a CD or DVD read/write mechanism. In yet still other cases, the portable media 110 may be any device capable of storing data and programs, such as a memory area of a cellular telephone. In the illustrative case of the portable media 110 being a memory area of a cellular telephone, the cellular telephone may couple to the computer system 100 by any suitable mechanism, such as a USB interface, a Bluetooth® brand wireless interface, or an Institute of Electrical and Electronic Engineers (IEEE) 1391 "fire-wire" interface. So as not to unduly complicate the remaining discussion, the balance of the discussion assumes that the portable media device 110 is a USB memory stick; however, the assumption of the balance of the discussion regarding the USB memory stick shall not be read as a limitation as to the applicability of the various embodiments.

In accordance with a particular embodiment, the portable media 110 stores several programs, one of which is a program that interfaces with the user and configures the computer system 100 to automatically reboot into a non-native operating system, hereafter referred to as the boot configuration program 113. In particular, during periods of time when the computer system 100 is controlled by the native operating system, the boot configuration program 113 is read from a portable media 110 and executed by the computer system 100. In addition to performing one or more precursor activities, such as verifying that the user has administrative privileges and/or verifying the user wants to reboot the computer system, the boot configuration program configures the computer system 100 to automatically reboot to a non-native operating system. In some cases, the entire set of programs and/or code to perform the configuration to automatically reboot the computer system to the non-native operating system may be contained on the illustrative portable media 110. In other cases, the program on the portable media 110 may be configured to perform some or all the precursor activities, and then download an additional program from any available source, such as the Internet, which additional program configures the computer system to automatically reboot to the non-native operating system. In yet still further cases, the program on the portable media 110 may be configured merely download the additional program from another source, again such as the Internet, which additional program configures the computer system to automatically reboot to the non-native operating system. The balance of the discussion will be based on the developmental context of having the boot configuration program 113 stored completely on the portable media 110, but the alternate cases may be equivalently used.

The boot configuration program 113 configures the computer system 100 to boot to a non-native operating system stored on the portable media 110, even in cases where the port 112 by which the portable media 110 couples to the computer system is not designated as a boot source in the basic input/output system (BIOS) of the computer system. Stated otherwise, during periods of time when the computer system 100 is under normal control of the BIOS, the BIOS searches for bootable devices and loads the bootable devices in a particular order, and the port 112 in a particular embodiment may not be designated as a potential boot source, or the highest priority boot source, for the computer system 100 as far as the BIOS is concerned.

Figure 2:
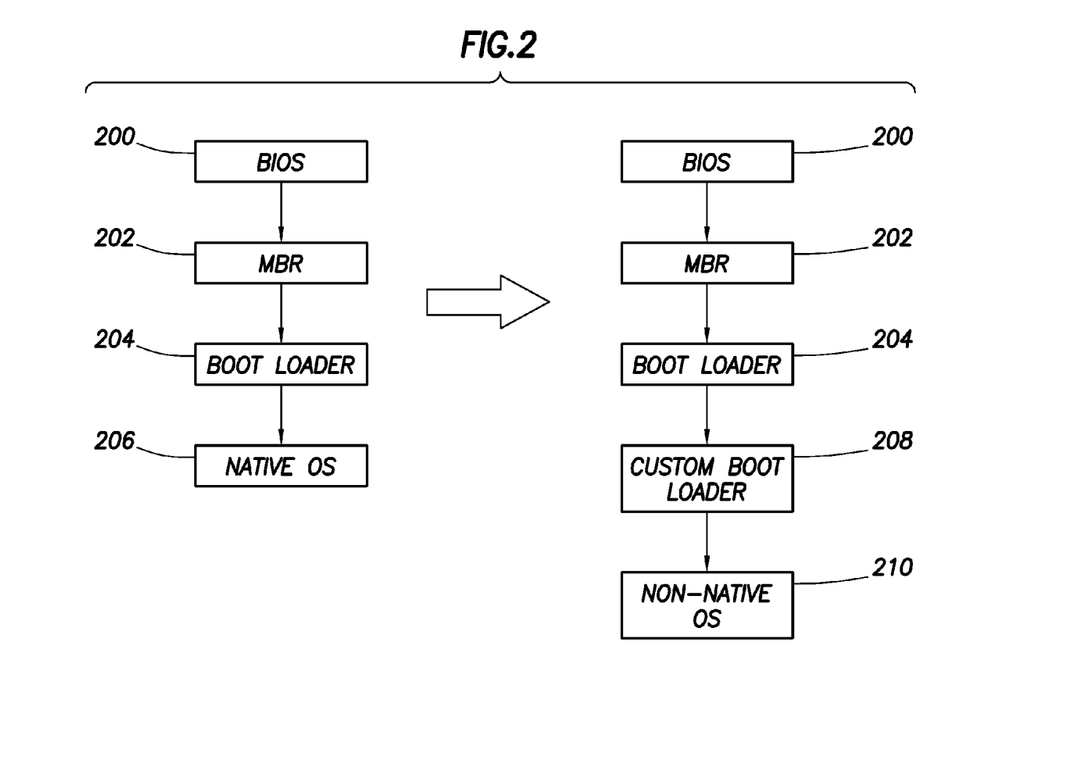
FIG. 2 shows aspects of booting a computer system in accordance with at least some embodiments.

In order to describe how a particular embodiment modifies the computer system 100 to boot the non-native operating system, attention is directed to FIG. 2. In particular, FIG. 2 shows steps to boot the native operating system on the computer system 100 on the left, as well as modifications made by way of a boot configuration program to have the computer system 100 boot the non-native operating system on the right. In particular, just after the power-on self-test (POST) procedures, control of the computer system is handed over to the BIOS 200. The BIOS 200 is hard-coded to look at a predetermined location of a bootable device (e.g. hard drive) as part of the boot process. More particularly still, the BIOS 200 is hard-coded to read the master boot record (MBR) 202. Thus, once the BIOS inspects and/or applies the various pieces of data found in the MBR 202, the BIOS then enables the processor to execute the boot loader 204. The boot loader 204, in turn, begins the process of copying the native operating system 206 into main memory and then enabling the processor of the computer system 100 to execute the native operating system, thus booting the native operating system on computer system 100.

The boot configuration program 112 modifies the boot sequence such that the computer system boots a non-native operating system. In particular, in the modified sequence (the right side of FIG. 2) the BIOS again 200 reads the master boot record 202 and then passes control to the boot loader 204. However, the boot configuration program 112 modifies operation of the boot loader 204 such that the boot loader now points to or loads a custom boot loader 208. The custom boot loader 208, in turn, points to or loads the non-native operating system 210. The specification turns first to illustrative embodiments of modifying operation of the boot loader 204, and then the specification discusses illustrative aspects of both the custom boot loader 208 and the non-native operating system 210.

Modifying operation of the boot loader 204 to point to or load the custom boot loader 208 may take many forms. For example, some embodiments modify the executable code of the boot loader 204 such that the code knows the location of the custom boot loader 208. In the illustrative case of Windows® XP operating systems, the boot loader 204 need not be changed, and instead the programs that the boot loader 204 loads may be changed by making modifications to a file on the long term storage device having a file name "boot.ini". In these embodiments, the boot configuration program 112 executed when the computer system 100 is operating under control of the native operating system changes the "boot.ini" file to point the boot loader 204 to the location of the custom boot loader 208. In the illustrative case of Windows® 7 or Windows® Vista, modifying operation of the boot loader 204 to point to the custom boot loader 208 may involve modifying the Boot Configuration Data (BCD). For computer systems that utilize an Extensible Firmware Interface (EFI), the BCD may be located on the EFI system partition. In computer systems that use IBM PC compatible firmware, the BCD may be located on the system volume at "\Boot\BCD". Other operating systems may require different changes to point the boot loader 204 to the custom boot loader 208; however, one having ordinary skill in the art, now understanding modifications used to change the behavior of the boot loader 204 based on this specification, could implement the changes without undue experimentation, regardless of the type of the native operating system. The specification now turns to various characteristics of the custom boot loader 208.

Still referring to FIG. 2, in a particular embodiment the boot configuration program copies the custom boot loader 208 from the portable media 110 to a location on the long term storage device of the computer system 100. During the illustrative modified sequence, the boot loader 204 thus loads the custom boot loader 208 from a location on the long term storage device of the computer system 100. Once the custom boot loader 208 is in control of the computer system 100, the custom boot loader 208 then loads the non-native operating system 210.

Loading of the non-native operating system 210 likewise may take many forms. In some cases, the non-native operating system 210 may have been downloaded to a location on the long term storage device of the computer system prior to the reboot, and where the custom boot loader 208 knows or is otherwise informed of the location of the non-native operating system 210. In other cases, the non-native operating system 210 may already be resident within the computer system, such as on a read only memory (ROM) device accessible to the custom boot loader. In yet still other cases, the custom boot loader 208 copies the non-native operating system 210 from the portable media 110. In embodiments where the custom boot loader 208 copies the non-native operating system 210 from the portable media 110, the custom boot loader 208 may comprise a driver configured to communicate with the portable media device 110 across the port 112. In accordance with yet still further embodiments, the custom boot loader 208 may comprise a plurality of drivers configured to communicate with a portable media across the respective plurality of ports. More particularly still, the custom boot loader 208 may not inherently know to which port the portable media 110, storing the non-native operating system, is coupled. Thus, the custom boot loader 208, using individual drivers, may search the various ports for the portable media device 110.

Figure 3:
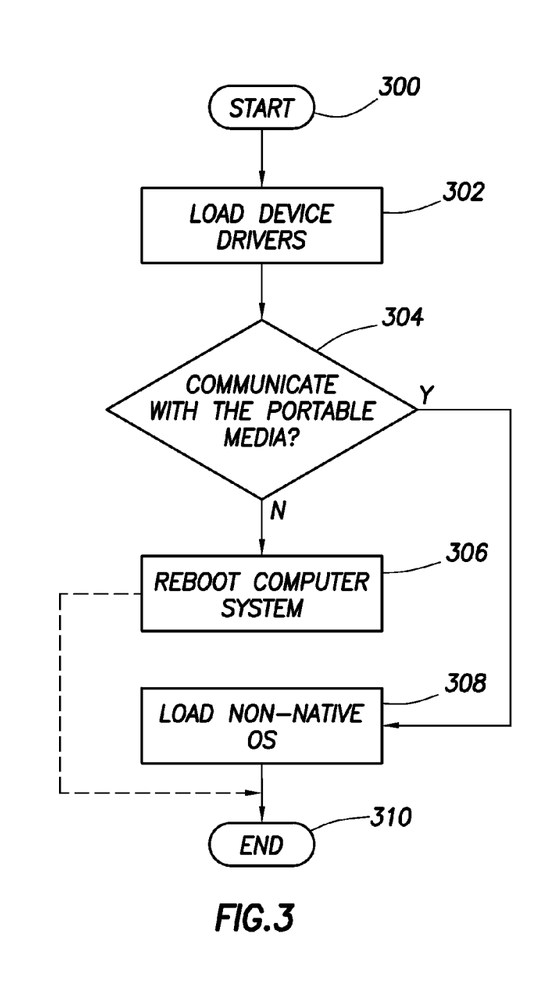
FIG. 3 shows a method in accordance with at least some embodiments.

FIG. 3 shows an illustrative flow diagram under which the custom boot loader 208 may operate in accordance with at least some embodiments. In particular, the method starts (block 300), and assuming that the custom boot loader 208 contains multiple device drivers (and that the custom boot loader 208 does not inherently know where the portable media 110 is coupled), the next step in the illustrative method may be loading a device driver (block 302). Thereafter, a determination as to whether the custom boot loader can communicate with the portable media (block 306). In accordance with at least some embodiments, the ability to communicate with the portable media likewise implies knowing the location of the non-native operating system under which to boot the computer system 100, and thus when the portable media device is found the next step in the illustrative method may be to load the non-native operating system onto the computer system (block 308). In some cases, the non-native operating system is copied directly from the portable media 110 to the main memory of the computer system. In other embodiments, the non-native operating system, or portions of the non-native operating system, may be copied to a long term storage device within the computer system, and then portions copied to the main memory for execution, with the remaining portions copied as needed. Once the computer system is operating under the non-native operating system, the illustrative method ends (block 310).

Still referring to FIG. 3, if the custom boot loader 208 is unable to communicate with the portable media (again block 304), then the illustrative custom boot loader may reboot the computer system (block 314), and the method effectively ends (block 310). The subsequent reboot in the particular situation will be to the native operating system. The specification now turns to further details regarding the custom boot loader 208.

The custom boot loader 208 may take many forms. In a particular embodiment, the custom boot loader 208 may be the Grand Unified Boot loader (GRUB) available as free software from the GNU project, modified to include at least one device driver to enable the boot loader to communicate with the portable media device 110. In other cases, the custom boot loader 208 may be a custom program configured to operate as described herein. One having ordinary skill in the art, now understanding operation of the custom boot loader 208 based on this description, could modify the GNU GRUB program, or create a custom boot loader anew, without undue experimentation.

Before continuing to a discussion of detecting and disabling malware programs, a few additional points regarding booting the non-native operating system to computer system 100 are in order. In many cases the end-users (as opposed to one of ordinary skill in the art) of a malware detection program operated in conformance with this specification may not fully understand the operational characteristics of a computer system. Thus, in accordance with at least some embodiments, the amount of technical input received from a user in order to reboot the computer system to the non-native operating system is reduced or eliminated. In at least one embodiment, after the precursor steps, the various steps implemented to boot the computer system 100 under the non-native operating system are taken autonomously. That is, the modifications to the appropriate locations in the native operating system, the copying of the custom boot loader, initiating reboot of the computer system, and booting the non-native operating system are done without requiring the user to provide any additional information. Further still, after the precursor activities, a user may only be presented with an option of whether to proceed, and upon receiving an affirmative response all the technical aspects implemented to boot the non-native operating system to the computer system may be implemented without further user input.

Returning to FIG. 2, the non-native operating system 210 may take any suitable form. In a particular embodiment, the non-native operating system 210 is a Linux-based operating system utilizing Linux Kernel. Thus, the native operating system may be a Windows®-based system while the non-native operating system may be a Linux-based system. However, the native and non-native operating systems need not be different, and thus the illustrative embodiments may be equivalently implemented with the native and non-native operating systems being the same, or being from the same operating system manufacturer. Again, so as not to unduly complicate the description, the specification will continue with respect to the native operating system being a Windows®-based system and the non-native system being a Linux-based system, but such shall not be read as limitation as to the breadth or applicability of the various embodiments.

As alluded to above, part of the advantage in detecting and disabling (e.g., modifying and/or removing) malware programs in accordance with the various embodiments is that the native operating system is not operational. Because the native operating system is not operational, the various malware programs will be unable to implement procedures used to hide or mask their presence. Also, by making performance enhancing changes while the native operating system is non-operational, inconvenience is reduced for the user as the user do not have to close programs or perform multiple reboot procedures. However, changing the operation of any program configured to run under the native operating system when the native operating system is not operational may need to be carefully implemented. Operating systems perform their various tasks based on a set of system configuration data, which system configuration data may reside in a single file within the file system or may be spread about multiple files in the file system. In the illustrative case of the Windows®-based operating systems, possibly starting with the Windows® 95 version, information that the operating system uses for correct operation is stored in a proprietary file format called registries, also known as registry hives. The registry hives may be multiple individual files spread about the file system. Considered as a whole, the illustrative registry hives contain keys and values. The term "keys" comprises not only values, but also sub keys, which sub keys may contain further sub keys. The term values are name/data pairs stored with the keys. The encoding mechanism for data within the files is not published by Microsoft Corporation. However, various third party sources have uncovered and/or discovered parts of the encoding mechanisms.

Regardless of the precise locations and encoding mechanisms, the registry hives store data about the system, and more particularly store data about the various programs that execute on the system. For example, by inspection of the registry hives one may be able to determine information such as: operating system versions; architecture; directory structure; users installed on the computer system; executable files installed on the computer system; libraries installed on the computer system; programs that are automatically launched at boot time; installed applications and their versions; web browser plug-ins installed in the system; toolbars installed in the system; and add-ons installed in the system. Malware programs also resident on the computer system will, in many cases, be reflected in the data within the registry hives.

When the computer system is operating under the control of the native operating system, the operating system provides application programming interfaces (APIs) that enable viewing and editing of the information in the registry hives. For example, in the illustrative case of Windows® XP the information in the registry hives may be accessed by execution of the "regedit.exe" executable program. However, when the native operating system is not operational, such application programming interfaces are not available in cases where the native and non-native operating systems are different. In cases where the native and non-native operating systems are the same, some application program interfaces may be available. Again, the specification continues under the assumption that the native and non-native operating systems are produced by different manufacturers.

Figure 4:
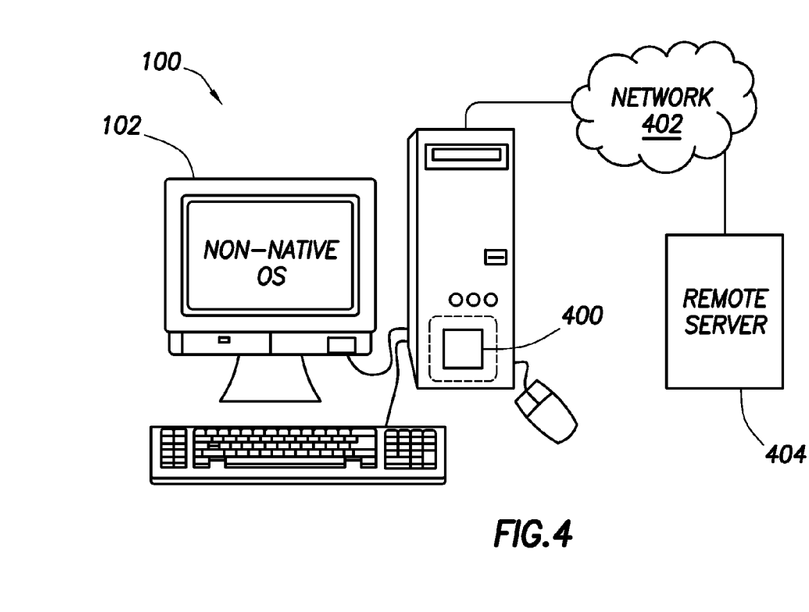
FIG. 4 shows a system in accordance with at least some embodiments.

In order to implement the detection and disabling of malware programs, a scan program or scan routine (executed by the computer system during periods of time when the non-native operating system is operational), accesses the system configuration data of the native operating system to make an initial determination as to the various installed users and installed programs on the computer system. FIG. 4 visually depicts such a situation. In particular, FIG. 4 illustrates computer system 100, except in this case computer system 100 has been booted under the non-native operating system, as illustrated on the display device 102. During periods of time when the computer system is controlled by the non-native operating system, scan program 400 performs operations regarding the system configuration data, and possibly other files, of the native operating system to implement the various embodiments.

Figure 5:
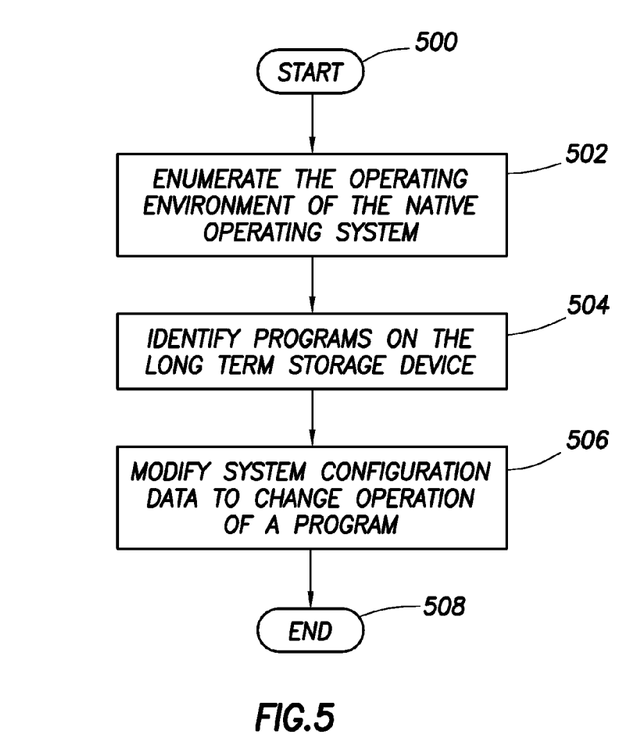
FIG. 5 shows a method in accordance with at least some embodiments.

FIG. 5 shows an illustrative method in accordance with at least some embodiments. In particular, FIG. 5 shows an illustrative series of steps that may be taken by the scan program 400 during periods of time in which the computer system is controlled by the non-native operating system 210. The method starts (block 500), and proceeds to enumerate the operating environment of the native operating system (block 502). Enumerating the operating system may take many forms, but in any event involves reading at least some of the layout and/or system configuration data of the native operating system by the scan program 400. In some embodiments, the scan program 400 determines any or all of the following information, which may be derived by inspection of the system configuration data: operating system versions; architecture; computer hardware type and manufacturer, file system directory structure; installed users of the computer system; location of operating system executable files; libraries and drivers installed on the computer system; programs and services launched at boot time; installed applications and their versions; web browser and general application plug-ins, toolbars, add-ons, and extensions installed in the system.

However, the extent of the enumeration will depend on the goals implemented by way of the scan program 400. For example, in the case of identification and disabling of malware programs, the name of the manufacturer of an attached display device may not be of particular concern. On the other hand, when the goal of the scan program 400 is to change operation of a program that is not necessarily a malware program (e.g., upgrading a program to a new version, as discussed more below), some or all of the illustrative information above may be of concern.

Still referring to FIG. 5, the next step in the illustrative method is identifying programs on the long term storage device (block 504) (e.g., identifying a program as a malware program, identifying a program as needing an update or patch). In some cases, the effective result of the enumeration discussed with respect to block 502 may be sufficient identification. However, in other cases, merely knowing a program or a registry entry exists may be insufficient, and the further identification may involve multiple pieces of information, some of which may be supplied by remote computer systems. In a particular embodiment, the scan program 400 does not inherently know or contain a list of programs of interest (such as a list of known virus programs). In these embodiments, the scan program 400 communicates with a remote server 404 over the network 402 (FIG. 4). More particularly still, in a particular embodiment the method may involve calculating a cryptographic hash value regarding a program or executable file, and sending the cryptographic hash value, possibly along with further information, to a remote server 404 over the network 402.

A cryptographic hash function is a mathematical function or procedure that takes as input a block of data and returns a fixed size value or bit string that is unique to the block of data, but in most cases is also of significantly smaller size. Thus, the scan program 400 may send the cryptographic hash value, along with additional information determined during the enumeration process, to a remote server 404 by way of the network 402. The remote server 404, in turn, analyzes the data supplied by the scan program and returns an indication to the scan program (over the network 402) as to the status of the program or executable file. In a particular embodiment, the remote server sends an indication as to whether the program or executable file should be considered a malware program for purposes of disabling (e.g., by modifying and/or removing) malware programs from the computer system 100. The remote server 404 may be a single server communicatively coupled to the computer system 100 over the network 402. In other embodiments the remote server 404 may be family of servers operated by way of a "cloud" functionality, such that work may be shared and/or exchanged among the servers depending on their loading and assigned tasks. Thus, the remote server 404 may perform the bulk of the determination process as to the status of any particular program or file on the computer system 100, with the determination made based on the information sent by the scan program 400. The remote server 404 in many cases will have greater computing functionality than the computer system 100, thus in some cases decreasing the overall amount of time needed to scan computer system 100 (dependent upon the speed/bandwidth of the connection).

Still referring to FIG. 5, the next step in the illustrative method may be a modification of system configuration data to change operation of a program on the computer system 100 (block 506), and the illustrative method ends (block 508). Modifying the system configuration data likewise may take many forms depending on the type of program and the end goal of the scan program 400. For example, if the program is identified as a malware program (as that term is defined in the specification), but where the user desires to have the program on the computer system (e.g., a program that automatically loads to the system tray, where such loading is not required for proper operation of the program), the change may be a modification to the system configuration data such that the program does not automatically start as part of the booting of the native operating system. In cases where the program is identified as a malware program with malicious intent, the change to the system configuration data may include not only modifying the system configuration data to implement removal of the malware program from operational status within the computer system 100, but also the scan program 400 may delete the program from the long term storage device.

The techniques discussed with respect to the scan program 400 reading and modifying the system configuration data of the native operating system may expand beyond addressing situations associated with malware programs. Stated otherwise, in addition to identifying and disabling malware programs, the scan program 400 operating with respect to the system configuration data of the native operating system may perform other beneficial tasks such as upgrading programs to a newer version, installing patches to existing programs (including patches to the native operating system), and/or uninstalling programs from the computer system. For example, installing patches may involve replacing existing files (such as ".DLL" files) at various places on the computer system. Upgrading a program may involve not only replacing various executable files, but likewise making respective changes in the system configuration data of the native operating system. In such cases, prior to installing a newer version of a program, the installation program (normally executed under the native operating system) can be analyzed to determine the locations for data and executable files, as well as the respective changes to the system configuration data to implement the installation. Likewise with respect to uninstalling programs from the computer system, uninstalling the programs may involve an analysis of the uninstall programs (normally executed under the native operating system) designed to perform the uninstallation-process such that the location of the data and executable files, as well as locations in the system configuration data, may be identified. Once these various locations and changes are identified, the scan program 400 may make the changes to uninstall the program, all while the computer system is controlled by the non-native operating system.

The various embodiments discussed to this point are based on operations to boot a computer system to a non-native operating system, and operations performed during periods of time when the computer system is operating under control of the non-native operating system. In a particular embodiment, a scan program searches for malware programs during periods of time the computer system is operating under the control of the non-native operating system. However, in the related-art scanning for malware programs on one's computer system has not been exposed to the world at large. That is, the fact one initiates a scan for malware, and the results of the scanning, have not traditionally been the subject of group discussion by way of an online social network. However, in accordance with at least some embodiments, scanning for and disabling of malware programs has a social aspect to encourage competition and sharing between friends, which may have beneficial results such as more frequent scanning for malware programs, earlier identification of new malware programs, and earlier eradication of certain malware programs.

Thus, in accordance with particular embodiments, in addition to identifying and possibly disabling of malware programs by a scan program 400 as discussed above, the scan program 400 further provides a social aspect. For example, the scan program 400 may post or display on the display device 102 one or more indications of meeting a predefined or predetermined achievement. For example, the scan program 400 may post a "badge" or points attainment indicating that the user has met an achievement with respect to searching for and disabling malware programs (e.g., run a predetermined number of scans in a predetermined period of time). Further still, the scan program 400 may display on the display device 102 indications regarding achievements of other users of similar scan programs on different computer systems, such that friendly competitions are created. For example, the scan program 400 may read achievements of other users from the server 404 across the network 402 (e.g., the other users being friends of the user of computer system 100), and post indications of the achievements of the other users on the display device 102 during periods of time when scan program 400 is in operation. Likewise, the scan program 400 may report the achievements related to the user of the computer system 100 to the server 404 for display on other computer systems. It is noted, however, that the achievements need not be concurrently achieved. The posting of achievements of other users may be achievements previously met, such that users need not be concurrently operating respective scan programs.

It follows that, in a particular embodiment, the manufacturer of the scan program 400 may operate and/or manage (directly or indirectly) a social network by way of the server 404, in addition to the aspects related to the identifying and disabling (e.g., by modifying and/or removing) malware programs as discussed above. In addition to, or in place of, the social network operated and/or managed by the manufacturer of the scan program, the posting of achievements may be to one or more social networks controlled by legal entities different than the legal entity that manufactures the scan program 400. As of the time of the writing of this specification, several online social networks exist (e.g., Facebook® brand social network provided by Facebook, Inc. of Palo Alto, Calif.; LINKEDIN.COM® brand social network provided by LinkedIn Corporation of Mountain View, Calif.: and TWITTER® brand social network provided by Twitter, Inc. of San Francisco, Calif.). Thus, in addition to, or in place of, a social network operated and/or managed by the manufacturer of the scan program 400, the scan program 400 may post to a social network operated and/or managed by a different legal entity, such as Facebook® or LINKEDIN.COM® brand social networks. For example, the scan program 400 may post a "badge" or achievement to the account of the user of the computer system 100 that indicates meeting the predetermined achievement, or the scan program may make a text "wall" posting indicating a scan for malware programs was performed and a result of the scan. Other users, for example friends of the user of computer system 100, may see the "badge" or achievement by way of their respective portals to the social network. Likewise, when the user of the computer system 100 access the user's respective portal for the social network, the user will be able to view the "badges" posted by respective scan programs of respective users in the group of friends.

The software mechanisms by which the scan program posts indication of achievements may be slightly different for each particular social network. In the illustrative case of the Facebook® brand social network, a set of application programming interfaces are provided which enable third party software to interact with the social network, at varying levels of integration. The integration levels may range from mere posting of comments to a user's "wall", to gleaning their relationships and/or "friends", to integration of the social network into the website and/or other third party application. For further information regarding interfacing with the illustrative Facebook® brand social network, attention is directed to the information available at the website www.developers.facebook.com. In an illustrative embodiment, the scan program 400 posts to multiple social networks, including the social network operated and/or managed by the manufacturer of the scan program 400.

The precise type of achievement may likewise take many forms. Examples of achievements comprise: performing a predetermined number (e.g., 10 or more) of scans for malware programs in a predetermined period of time (e.g., a month); performing the greatest number of scans on distinct computer system; identifying by way of a scan a previously unidentified malware program (e.g., new virus, new worm); performing a scan on a computer system where a record number of malware programs are resident; performing a scan on a computer system where the fewest number of malware programs are identified; performing a scan in a particular geolocation; the user's friend network reaching a certain depth; a cumulative number of malware programs that have been disabled by a user; a cumulative number of malware programs that have been disabled by a user and his friend network; initiation of a scan on a computer whose hardware was unique to the social network (e.g., fastest, largest); an indication of winning a contest or competition amongst a friend network, a geographic network (e.g., everyone in Austin, Tex.), or the global network; performing a scan that can be construed as a referral request for the product; using the product for the first time or during a unique time (e.g., Valentines day use); and identifying a specific piece of an already identified malware program. Moreover, the competitions fostered by sharing information through a social network may be future looking. For example "badges" may be awarded and posted for the greater number of computer system scans in a future time certain (e.g., the next month), or finding the most number of viruses in a future time certain.

Figure 6:
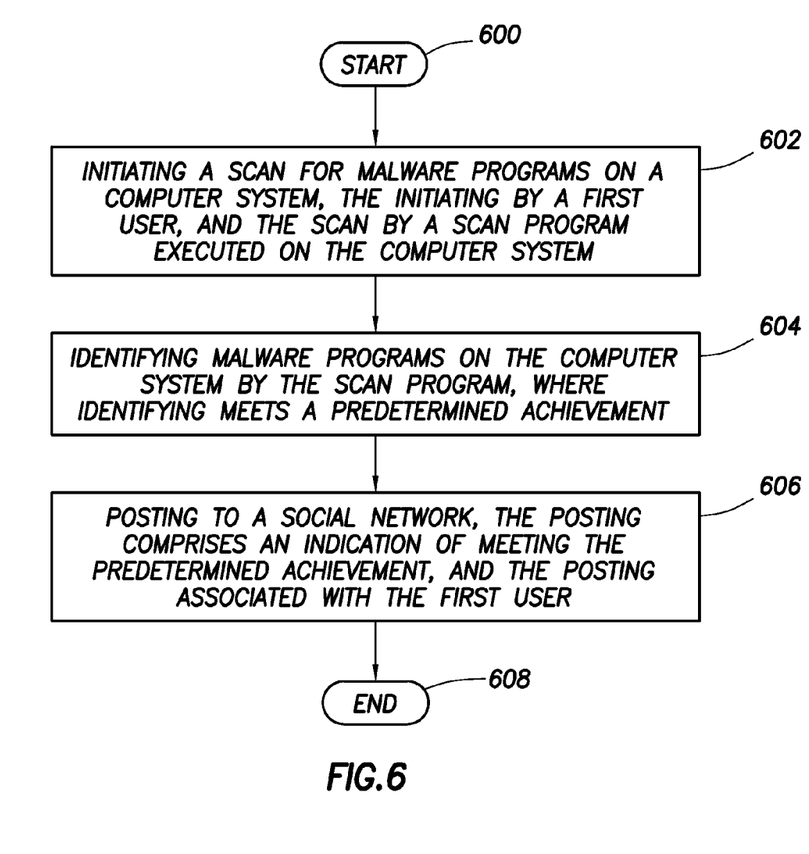
FIG. 6 shows a method in accordance with at least some embodiments.

FIG. 6 shows a method in accordance with at least some embodiments, the illustrative method related to social aspects of at least some embodiments. In particular, the method starts (block 600) and comprises: initiating a scan for malware programs on a computer system, the initiating by a first user, and the scan by a scan program executed on the computer system (block 602); identifying malware programs on the computer system by the scan program, where identifying meets a predetermined achievement (block 604); and posting to a social network, the posting comprises an indication of meeting the predetermined achievement, and the posting associated with the first user (block 606). Thereafter, the method ends (block 608). The posting may be to a social network operated and/or managed by the manufacturer of the scan program, to social networks operated and/or managed by legal entities different than the manufacturer of the scan program, or both. Furthermore, the posting may be by or at the request of the scan program, and may involve the scan program invoking other locally or remotely executed programs, including invoking programs run on the server 404. Further still, the posting may be at a later time by program executed on the remote server, the posting based on information provided by the scan program.

Figure 7:
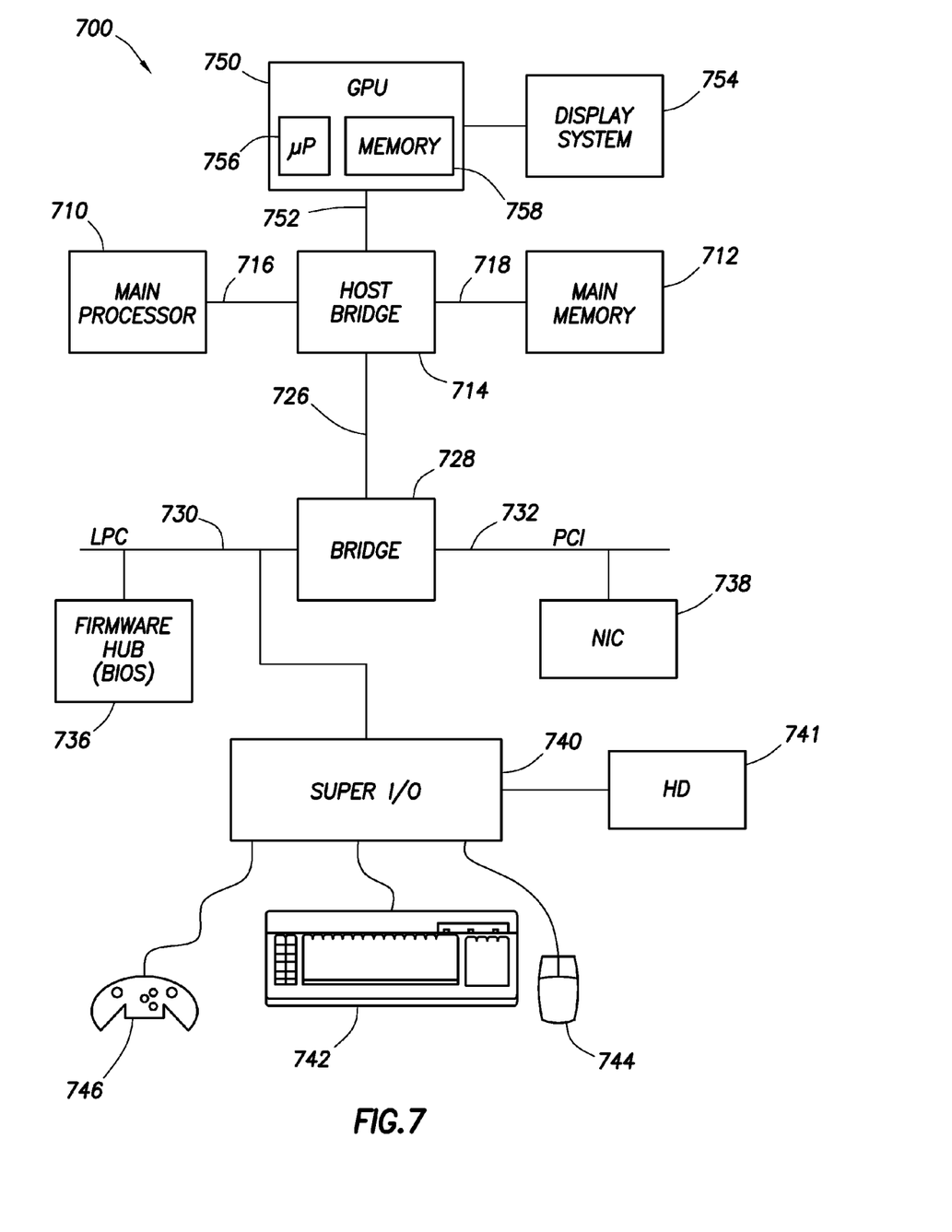
FIG. 7 shows a computer system in accordance with at least some embodiments.

The specification discusses several computer systems. For example, the various operations to achieve the non-native boot and scanning for malware programs are discussed with respect to computer system 100. Aspects of identifying malware programs may involve communication with server 404. Likewise, aspects of implementing social aspects may involve communication between the computer system 100, server 404 and other computer systems that implement and/or host the social network. FIG. 7 illustrates a computer system 700 in accordance with at least some embodiments, and upon which at least some of the various embodiments may be implemented. Thus, computer system 700 may be computer system 100, server 404, or any other computer system upon which aspects of the various embodiments are implemented.

In particular, computer system 700 comprises a main processor 710 coupled to a main memory array 712, and various other peripheral computer system components, through integrated host bridge 714. The main processor 710 may be a single processor core device, or a processor implementing multiple processor cores. Furthermore, computer system 700 may implement multiple main processors 710. The main processor 710 couples to the host bridge 714 by way of a host bus 716 or the host bridge 714 may be integrated into the main processor 710. Thus, the computer system 700 may implement other bus configurations or bus-bridges in addition to, or in place of, those shown in FIG. 7.

The main memory 712 couples to the host bridge 714 through a memory bus 718. Thus, the host bridge 714 comprises a memory control unit that controls transactions to the main memory 712 by asserting control signals for memory accesses. In other embodiments, the main processor 710 directly implements a memory control unit, and the main memory 712 may couple directly to the main processor 710. The main memory 712 functions as the working memory for the main processor 710 and comprises a memory device or array of memory devices in which programs, instructions and data are stored. The main memory 712 may comprise any suitable type of memory such as dynamic random access memory (DRAM) or any of the various types of DRAM devices such as synchronous DRAM (SDRAM) (including double data rate (DDR) SDRAM, double-data-rate two (DDR2) SDRAM, double-data-rate three (DDR3) SDRAM), extended data output DRAM (EDODRAM), or Rambus DRAM (RDRAM). The main memory 612 is an example of a non-transitory computer-readable medium storing programs and instructions, and other examples are disk drives and flash memory devices.

The illustrative computer system 700 also comprises a second bridge 728 that bridges the primary expansion bus 726 to various secondary expansion buses, such as a low pin count (LPC) bus 730 and peripheral components interconnect (PCI) bus 732. Various other secondary expansion buses may be supported by the bridge device 728. In accordance with some embodiments, the bridge device 728 comprises an Input/Output Controller Hub (ICH) manufactured by Intel Corporation, and thus the primary expansion bus 726 comprises a Hub-link bus, which is a proprietary bus of the Intel Corporation. However, computer system 700 is not limited to any particular chip set manufacturer, and thus bridge devices and expansion bus protocols from other manufacturers may be equivalently used.

Firmware hub 736 couples to the bridge device 728 by way of the LPC bus 730. The firmware hub 736 comprises read-only memory (ROM) which contains software programs executable by the main processor 710. The software programs comprise programs executed during and just after POST procedures, memory reference code, and the BIOS. The POST procedures and memory reference code perform various functions within the computer system before control of the computer system is turned over to the boot loader.

The computer system 700 further comprises a network interface card (NIC) 738 illustratively coupled to the PCI bus 732. The NIC 738 acts as to couple the computer system 700 to a network, such the Internet.

Still referring to FIG. 10, computer system 700 may further comprise a super input/output (I/O) controller 740 coupled to the bridge 728 by way of the LPC bus 730. The Super I/O controller 740 controls many computer system functions, for example interfacing with various input and output devices such as a keyboard 742, a pointing device 744 (e.g., mouse), game controller 746, various serial ports, floppy drives and hard disk drives (HD) 741. The hard disk drive 741 is an example of a long term storage device upon which a native operating system and related system configuration data may reside. In other cases, the hard disk drive 741 may couple to a separate drive controller coupled to a more powerful expansion bus, such as the PCI bus 732, particularly in cases where the hard disk drive is implemented as an array of drives (e.g., redundant array of independent (or inexpensive) disks (RAID))

The computer system 700 further comprises a graphics processing unit (GPU) 750 coupled to the host bridge 714 by way of bus 752, such as a PCI Express (PCI-E) bus or Advanced Graphics Processing (AGP) bus. Other bus systems, including after-developed bus systems, may be equivalently used. Moreover, the graphics processing unit 750 may alternatively couple to the primary expansion bus 726, or one of the secondary expansion buses (e.g., PCI bus 732). The graphics processing unit 750 couples to a display system 754 which may comprise any suitable electronic display device or multiple distinct display devices, upon which any image or text can be displayed. The graphics processing unit 750 comprises an onboard processor 756, as well as onboard memory 758. The processor 756 may thus perform graphics processing, as commanded by the main processor 710. Moreover, the memory 758 may be significant, on the order of several hundred gigabytes or more. Thus, once commanded by the main processor 710, the graphics processing unit 750 may perform significant calculations regarding graphics to be displayed on the display system, and ultimately display such graphics, without further input or assistance of the main processor 710. In some case, such as the computer system 700 operated as server 404, the graphics processing unit 750 and display system 754 may be omitted.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than a signal traveling along a conductor or carrier wave) for storing a software program to implement the method aspects of the various embodiments.

The above discussion is meant to be illustrative of the principles and various embodiments of the present invention.

Numerous variations and modifications will become apparent to those skilled in the art once the above disclosure is fully appreciated. For example, the functionality described could be part or portion of a larger overall application. Furthermore, while the enumeration discussed with respect to the native operating system provides much information that may be useful for identifying and disabling malware programs, additional useful information may also found by inspecting files in locations not derived from the enumeration, such as files in the start-up directories of the operating system. It is intended that the following claims be interpreted to embrace all such variations and modifications.

What is claimed is:

1. A method comprising:
changing operation of a program on a computer system that comprises a native operating system on a long term storage device, the changing by:
copying a custom bootloader to the long term storage device;
loading the custom bootloader;
loading a non-native operating system by the custom bootloader;
reading system configuration data of the native operating system, the reading by a scan program executed under the non-native operating system booted on the computer system;
identifying, by the scan program, the program on the computer system; and
modifying, by the scan program, the system configuration data of the native operating system such that the change in operation of the program is implemented on a subsequent boot of the computer system under the native operating system.

2. The method of claim 1 further comprising wherein modifying the system configuration data further comprises changing data regarding the program in the system configuration data.

3. The method of claim 2 further comprising deleting the program from the computer system.

4. The method of claim 1 wherein modifying the system configuration data further comprises modifying the system configuration data such that the program is not automatically started as part of booting the native operating system.

5. The method of claim 1 wherein modifying the system configuration data further comprises modifying the system configuration data such that the program is not automatically started after booting the native operating system.

6. The method of claim 1 wherein modifying the system configuration data further comprises deleting the program from the computer system.

7. The method of claim 1 wherein changing operation further comprises upgrading the program to a newer version.

8. The method of claim 1 wherein changing operation further comprises installing a patch for the program.

9. The method of claim 1 wherein changing operation further comprises uninstalling the program from the computer system.

10. A non-transitory computer-readable media that stores a program that, when executed by a processor of a computer system, causes the processor to:
copy a custom bootloader to a long term storage device;
load the custom bootloader;
load a non-native operating system by the custom bootloader;
read system configuration data of a native operating system of the computer system, the read during periods of time in which the computer system is operating under the non-native operating system; and
modify the system configuration data of the native operating system such that a change in operation of a target program is implemented on a subsequent boot of the computer system under the native operating system, the modification during periods of time in which the computer system is operated under the non-native operating system, and the target program configured to operate under the native operating system.

11. The non-transitory computer-readable media of claim 10 wherein when the processor modifies the system configuration data, the program further causes the processor to change data regarding the target program in the system configuration data.

12. The non-transitory computer-readable media of claim 11 wherein the program further causes the processor to delete the target program from the computer system.

13. The non-transitory computer-readable media of claim 10 wherein when the processor modifies the system configuration data, the program further causes the processor to modify the system configuration data such that the program is not automatically started as part of booting the native operating system.

14. The non-transitory computer-readable media of claim 10 wherein when the processor modifies the system configuration data, the program further causes the processor to modify the system configuration data such that the program is not automatically started after booting the native operating system.

15. The non-transitory computer-readable media of claim 10 wherein when the processor modifies the system configuration data, the program further causes the processor to delete the target program.

16. The non-transitory computer-readable media of claim 10 wherein when the processor modifies the system configuration data, the program further causes the processor to upgrade the target program to a newer version.

17. The non-transitory computer-readable media of claim 10 wherein when the processor modifies the system configuration data, the program further causes the processor to install a patch for the target program.

18. The non-transitory computer-readable media of claim 10 wherein when the processor modifies the system configuration data, the program further causes the processor to uninstall the target program.

19. A non-transitory computer-readable media that stores a program that, when executed by a processor of a computer system, causes the processor to:
copy a custom bootloader to a long term storage device;
load the custom bootloader;
load a non-native operating system by the custom bootloader;
read system configuration data of a native operating system of the computer system, the read during periods of time in which the computer system is operating under the non-native operating system; and
modify the system configuration data of the native operating system such that a malware program is disabled on a subsequent boot of the computer system under the native operating system, the modification during periods of time in which the computer system is operated under the non-native operating system, and the malware program configured to operate under the native operating system.

20. The non-transitory computer-readable media of claim 19 wherein when the processor modifies the system configuration data, the program further causes the processor to change data regarding the malware program in the system configuration data.

21. The non-transitory computer-readable media of claim 19 wherein when the processor modifies the system configuration data, the program further causes the processor to modify the system configuration data such that the malware program is not automatically started as part of booting the native operating system.

22. The non-transitory computer-readable media of claim 19 wherein when the processor modifies the system configuration data, the program further causes the processor to modify the system configuration data such that the malware program is not automatically started after booting the native operating system.

23. The non-transitory computer-readable media of claim 19 wherein when the processor modifies the system configuration data, the program further causes the processor to delete the malware program from the computer system.

24. The non-transitory computer-readable media of claim 19 wherein when the processor modifies the system configuration data, the program further causes the processor to uninstall the malware program from the computer system.

* * * * *